United States Patent [19]

Sugimoto et al.

[11] Patent Number: 5,799,640
[45] Date of Patent: Sep. 1, 1998

[54] FUEL FEED DEVICE FOR GAS ENGINES AND GAS-ENGINE-POWERED WORKING MACHINE

[75] Inventors: Yasuhiro Sugimoto; Nobuo Suzuki; Akihito Kasai; Takahiro Ideguchi, all of Wako, Japan

[73] Assignee: Honda Giken Kogyo Kabushiki Kaisha, Tokyo, Japan

[21] Appl. No.: 955,248

[22] Filed: Oct. 21, 1997

[30] Foreign Application Priority Data

Oct. 30, 1996 [JP] Japan ................. 8-288795

[51] Int. Cl.⁶ ............................................. F02M 31/125
[52] U.S. Cl. ........................... 123/527; 123/549; 123/557
[58] Field of Search ................................. 123/527, 549, 123/557; 220/201, 577, 735

[56] References Cited

U.S. PATENT DOCUMENTS

| | | | |
|---|---|---|---|
| 4,492,208 | 1/1985 | Lent | 123/527 |
| 4,503,812 | 3/1985 | Eberhardt | 123/527 |
| 5,086,748 | 2/1992 | Yokoyama et al. | 123/527 |
| 5,483,943 | 1/1996 | Peters | 123/527 |
| 5,499,615 | 3/1996 | Lawrence et al. | 123/527 |

FOREIGN PATENT DOCUMENTS

| | | |
|---|---|---|
| 62-128932 | 8/1987 | Japan . |
| 62-143056 | 9/1987 | Japan . |
| 62-150570 | 9/1987 | Japan . |
| 2-23260 | 1/1990 | Japan . |

*Primary Examiner*—Erick R. Solis
*Attorney, Agent, or Firm*—Merchant, Gould, Smith, Edell, Welter & Schmidt, P.A.

[57] ABSTRACT

A fuel feed device for a gas engine includes a thermally insulated cartridge case for receiving therein a disposable gas cylinder or cartridge. The cartridge case has a built-in temperature sensor for detecting the temperature of the gas cartridge, and a built-in electric heater for heating the gas cartridge. The electric heater is controlled such that the temperature detected by the temperature sensor is kept within a predetermined temperature range. A working machine driven by the gas engine is also disclosed.

8 Claims, 4 Drawing Sheets

FUEL FEED DEVICE FOR GAS ENGINES AND GAS-ENGINE-POWERED WORKING MACHINE

BACKGROUND OF THE INVENTION

1. Field of the Invention

The present invention relates to a fuel feed device for gas engines including a disposable gas cylinder or cartridge for home or domestic use, and a gas-engine-powered working machine driven by a gas engine.

2. Description of the Related Art

Disposable metal gas cylinders or cartridges hold therein a liquefied gas such as LPG (liquefied petroleum gas) including LBG (liquefied butane gas). The liquefied gas is supplied from the gas cartridge to a gas engine via a pressure regulator which regulates the pressure of the liquefied gas before the gas is burnt or combusted in the gas engine. The liquefied gas, as it flows out from the gas cartridge to become vaporized, takes away a great amount heat from the gas cartridge due to latent heat of vaporization. The gas cartridge is, therefore, likely to be cooled excessively with the result that vaporization of the liquefied gas is made insufficient to secure smooth feed of fuel gas to the gas engine.

To deal with this problem, Japanese Utility Model Laid-open Publications Nos. SHO 62-143056 and SHO 62-150570 disclose known proposals both entitled "Device for Promoting Vaporization of Liquefied Fuel Gas for Gas Engines".

The vaporization promoting device disclosed in Japanese Utility Model Laid-open Publication No. SHO 62-143056 includes a gas cartridge, a cartridge box for receiving therein the gas cartridge, a helically coiled bimetal disposed inside the cartridge box for detecting the temperature of the gas cartridge, and a flow control damper connected to the bimetal for its opening and closing operation to regulate the quantity of exhaust gas flowing into an exhaust gas inlet formed in the cartridge box. The disclosed vaporization promoting device is constructed such that the gas cartridge is heated by using heat of the exhaust gas when it is in a low temperature condition, while the gas cartridge is not heated when it is in a high temperature condition.

Another known vaporization promoting device disclosed in Japanese Utility Model Laid-open Publication No. SHO 62-150570 includes a gas cartridge, a cartridge box for receiving therein the gas cartridge, a helically coiled bimetal disposed inside the cartridge box for detecting the temperature of the gas cartridge, and an exhaust gas guide member connected to the bimetal for being disposed selectively in a first position where an exhaust gas inlet is formed in the cartridge box, and a position remote from the first position. The disclosed vaporization promoting device is similar in function to the first-mentioned device in that heat of the exhaust gas is utilized to heat the gas cartridge when the temperature of the gas cartridge is below a preset value.

The known vaporization promoting devices disclosed in the Japanese publications specified above are liable to be influenced by a change in environmental conditions, such as outside air temperature, and thus exerts direct influence on the temperature of the gas cartridge. In addition, since the gas cartridge is heated by using the exhaust gas, it takes a relatively long time to raise the temperature of the gas cartridge to a desired value. Furthermore, due to the reliance on a mechanical temperature regulation system for the gas cartridge, the known vaporization promoting devices are complicated in construction and poor in durability.

To improve the responsibility to a change in fuel supply conditions without being influenced by a chance in environmental conditions including outside air temperature, an improvement has been proposed as disclosed in Japanese Patent Laid-open Publication No. HEI 2-23260, entitled "Fuel Feed Device".

The proposed fuel feed device includes a gas cartridge, a diaphragm for detecting the pressure of gas flowing out from the gas cartridge, a switch adapted to be turned on and off under the control of operation of the diaphragm, and an electric heater energized by a power supply for heating the gas cartridge when the switch is turned on. The thus constructed fuel feed device operates to heat the gas cartridge when the gas pressure detected by the diaphragm is below a predetermined value.

The fuel feed device disclosed in Japanese Patent Laid-open Publication No. HEI 2-23260 has a drawback that heating of the gas cartridge depending on the detection of the fuel gas pressure tends to cause insufficient vaporization of the liquefied gas or overheating of the gas cartridge when the quantity of heat applied to the gas cartridge is inadequate. Another drawback is that heating of the gas cartridge is still performed even when the gas pressure becomes small due to consumption of the liquefied gas. The fuel feed device has no construction to insure efficient heat transfer from the electric heater to the gas cartridge, and so the electric energy is consumed inefficiently.

Working machines using a gas engine are known, such as disclosed in Japanese Utility Model Laid-open Publication No. SHO 62-128932, entitled "Gas-engine-powered Walking Agricultural Working Machine". The disclosed working machine has a cartridge fixed to a handle by a cartridge holder. The gas cartridge and the cartridge holder are disposed between a pair of handlebars of the handle. The working machine of the foregoing construction has a drawback that the gas cartridge is readily influenced by a change in environmental conditions such as outside air temperature.

SUMMARY OF THE INVENTION

According to a first aspect of the present invention, there is provided a fuel feed device for feeding a fuel gas from a gas cartridge to a gas engine, comprising: a thermally insulated cartridge case capable of being opened and closed for removably receiving therein the gas cartridge; a temperature sensor disposed inside the thermally insulated cartridge case for detecting a temperature of the gas cartridge; and an electric heater built in the thermally insulated cartridge case for heating the gas cartridge on the basis of the temperature detected by the temperature sensor so that the temperature detected by the temperature sensor is kept within a predetermined temperature range.

The thermally insulated cartridge case is able to keep the gas cartridge free from the influence of a change in environmental conditions such as outside air temperature. The liquefied gas held in the gas cartridge can, therefore, be kept at a temperature suitable for vaporization.

When the liquefied fuel gas is difficult to become vaporized due to undue low temperature, the electric heater used in combination with the temperature sensor is operated to heat the gas cartridge in such a manner the temperature of the gas cartridge is kept in a predetermined temperature range which is suitable for vaporizing fuel gas efficiently. The predetermined temperature range may be 20° C.±5° C. The electric heater is controlled by the temperature control unit so as to keep the temperature of the gas cartridge within the predetermined temperature range specified above.

Since the electric heater is disposed inside the thermally insulated cartridge case for heating the gas cartridge received in the cartridge case, heat generated by the electric heater is efficiently transmitted to the liquefied fuel gas via the gas cartridge.

Preferably, the electric heater has an arcuate transverse cross-sectional shape and is arranged to heat a sidewall of the gas cartridge along a lower portion thereof while the gas cartridge is received in the thermally insulated cartridge case. This arrangement is particularly advantageous in that the heat generated by the electric heater is effectively transferred to the liquefied gas because the liquefied gas is held in contact with the lower sidewall portion of the gas cartridge until the gas cartridge becomes almost empty.

The temperature sensor is preferably arranged so as to be disposed in the proximity of a sidewall of the gas cartridge while being received the cartridge case. This arrangement makes it possible to insure easy and accurate detection of the temperature of the gas cartridge on the basis of a temperature of the sidewall of the gas cartridge.

Preferably, the thermally insulated cartridge case is disposed independently at a position remote from the engine. The cartridge case thus arranged has a great degree of freedom of installation.

According to a second aspect of the present invention, there is provided a gas-engine-powered working machine including a gas engine using a fuel gas supplied from a gas cartridge, comprising: a working unit driven by the gas engine and having at least one wheel for enabling the working machine to be transported from one point to another; a steering handle unit operatively connected to the working unit to steer the same; a thermally insulated cartridge case disposed on the steering handle unit and capable of being opened and closed for removably receiving therein the gas cartridge; a temperature sensor disposed inside the thermally insulated cartridge case for detecting a temperature of the gas cartridge; and an electric heater built in the thermally insulated cartridge case for heating the gas cartridge on the basis of the temperature detected by the temperature sensor so that the temperature detected by the temperature sensor is always kept within a predetermined temperature range.

The gas cartridge used for holding a fuel gas to be supplied to the gas engine of the working machine is easy to handle, store and transport and hence is particularly suitable for use with an agricultural working machine. The gas cartridge received in the thermally insulated cartridge case is substantially independent of a change in environmental conditions including outside air temperature.

Preferably, the thermally insulated cartridge case is attached to a handle post of a steering handle unit of the working machine in such a manner that the gas cartridge received in the cartridge case extends longitudinally of the handle post. This arrangement makes it possible to utilize a space in the working machine efficiently without hindering smooth manipulation of the steering handle unit by the operator and to appropriately distribute the overall weight of the working machine.

The above and other features and advantages of the present invention will become more apparent from the following description when making reference to the detailed description and the accompanying sheets of drawings in which a preferred structural embodiment incorporating the principles of the present invention is shown by way of illustrated example.

DETAILED DESCRIPTION OF THE PREFERRED EMBODIMENTS

One preferred embodiment of the present invention will be described below in greater detail with reference to the accompanying drawings.

Figure 1:
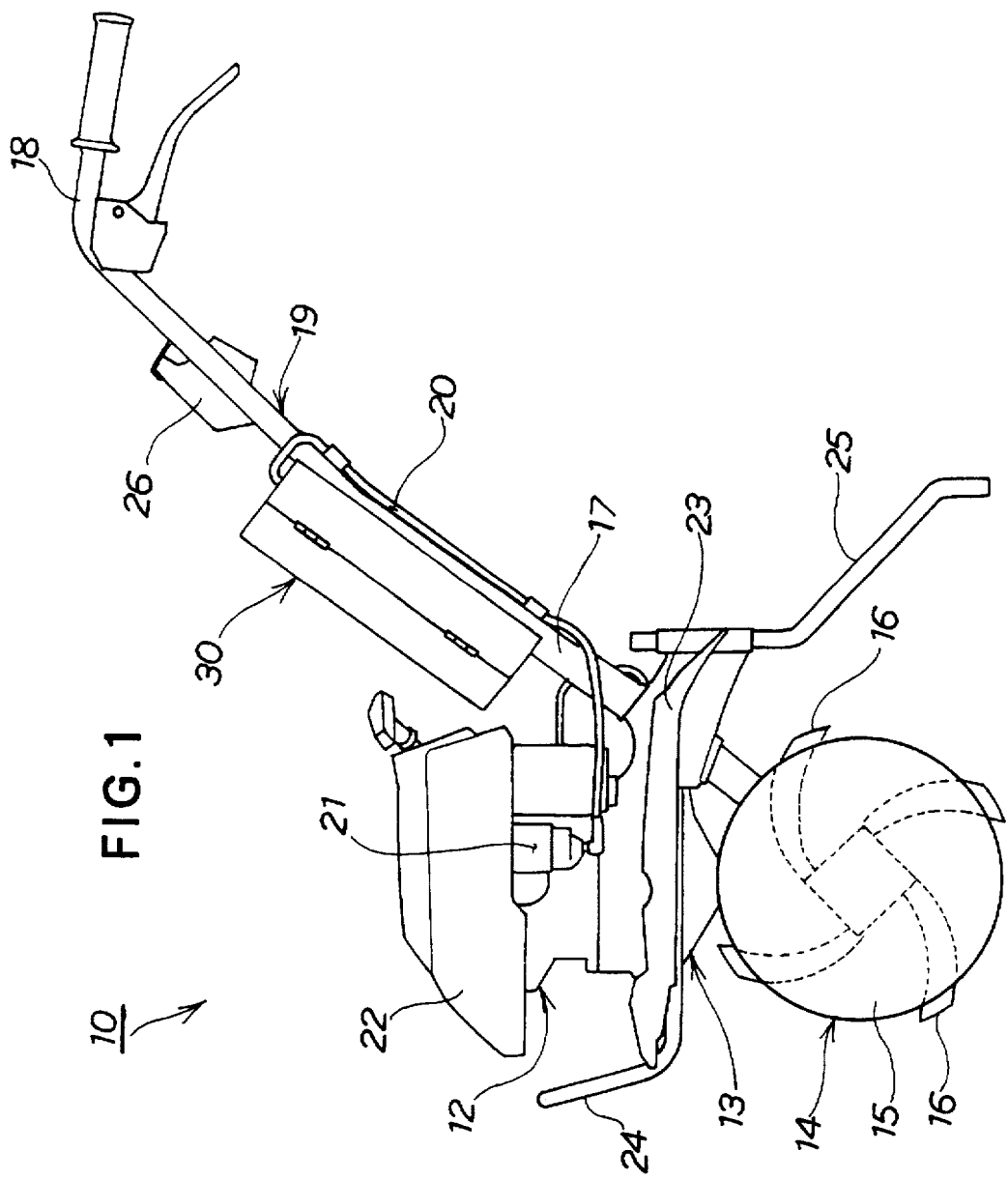
FIG. 1 is a side view of a gas-engine-powered working machine according to the present invention.

FIG. 1 shows a gas-engine-powered working machine 10 including a gas engine 12 that uses a gaseous fuel supplied from a disposable gas cylinder or cartridge described below. The gas engine 12 is connected at its lower end to a power transmission unit 13 so that output power of the gas engine 12 is transmitted by the power transmission unit 13 to a working tool unit 14 of the working machine 10. The working tool unit 14 includes a pair of wheels (only one being shown) 15 rotatably driven by the engine power transmitted thereto via the power transmission unit 13, and a plurality of angularly spaced cultivating blades 16 rotatable about a common axis of the wheels 15 simultaneously with rotation of the wheels 15. The power transmission unit 13 has a rear end portion on which an elongated handle post 17 is journaled at its lower portion. The handle post 17 has an upper end formed integrally with a handle 18.

The handle post 17 supports thereon a fuel gas feed device (hereinafter referred to, for brevity, as "fuel feed device") 30 arranged along an axis of the handle post 17. The handle post 17 and the handle 18 jointly form a steering handle unit 19. The handle post 17 has a lower end operatively connected to the wheels 15 so that the working tool unit 14 as a whole can be steered by manipulating the steering handle unit 19.

The fuel feed device 30 is connected by a gas feed pipe 20 to a mixer 21 which functions to mix fuel gas supplied from the fuel feed device 30 with air at a proper mixture ratio and then supply the fuel-and-air mixture into a combustion chamber (not shown) of the gas engine 12.

The working machine 10 further includes an engine cover 22, a splash guard 23 for preventing the working unit 14 from muddying the operator, a front body guard 24, a support stand 25, and a control box 26 containing therein an engine control circuit.

Figure 2:
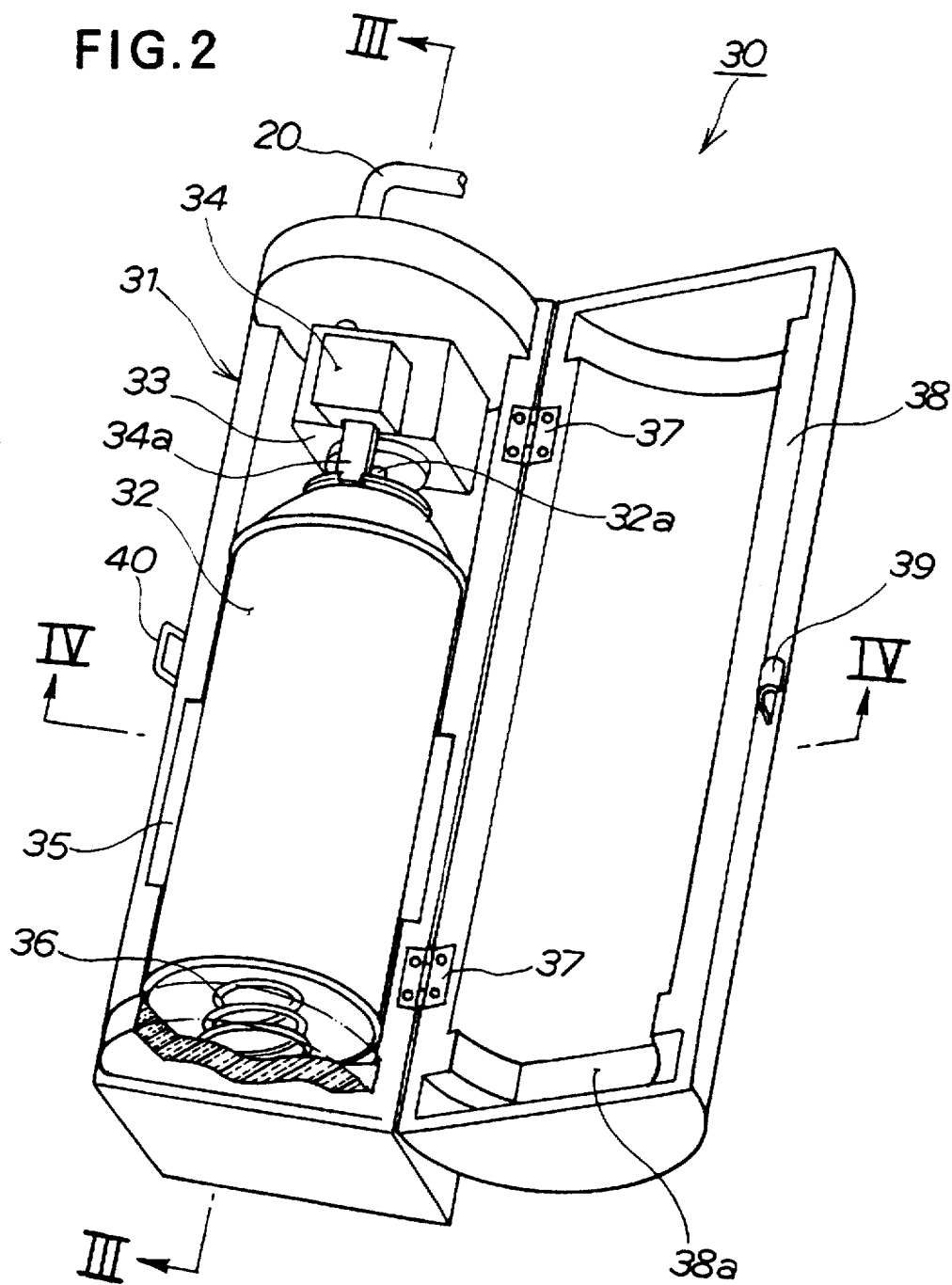
FIG. 2 is a perspective view of a fuel gas feed device of the gas-engine-powered working machine.

Reference is now being made to FIG. 2 in which the fuel feed device 30 is shown in perspective. The fuel feed device 30 includes a thermally insulated cartridge case 31 that uses a heat insulator or has a heat-insulating structure capable of isolating the inside of the cartridge case 31 from the effect of the outside air temperature. The cartridge case 31 receives therein a disposable gas cylinder or cartridge 32. The gas cartridge 32 has a discharge tube 32a adapted to be connected to a regulator 33. The regulator 33 is disposed inside the cartridge case 31 adjacent to one end (upper end in FIG. 3) thereof, and a cartridge sensor 34 is disposed on the regulator 33 for detecting a setting condition of the gas cartridge 32 so as to determine whether or not the gas cartridge 32 is correctly set in the cartridge case 31.

An electric heater 35 is assembled or built in the cartridge case 31 for heating a sidewall (cylindrical outside surface) of the gas cartridge 32 along a lower half thereof. To this end, the heater 35 has an arcuate transverse cross-sectional shape which is complementary in contour to the shape of a part of the sidewall of the gas cartridge 32 and hence is able to heat this sidewall part of the gas cartridge 32. The heater 35 has a built-in heater sensor (not shown) so that the heater temperature is maintained at a value indicated by the heater sensor. A compression coil spring 36 is disposed inside the cartridge case 31 and located at the opposite end (lower end in FIG. 3) of the cartridge case 31 for resiliently urging the gas cartridge 32 against the regulator 33.

The thermally insulated cartridge case 31 has a lid 38 pivotally connected by a pair of hinges 37, 37 to a body of the cartridge case 31 for selectively opening and closing the cartridge case 31. The hinged lid 38 has on its inside surface a projection 38a so designed as to engage a portion of the gas cartridge 32 to prevent the lid 38 from being fully closed when the gas cartridge 32 is incorrectly set in the cartridge case 31. Incorrect setting of the gas cartridge 32 may be experienced when the gas cartridge 32 is unintentionally displaced from the correct setting position toward the compression coil spring 36 during manual setting operation. The projection 38a on the lid 38 and the cartridge sensor 34 cooperate with each other to preclude mis-setting of the gas cartridge 32.

The lid 38 further has a locking hook 39 releasably engageable with an eye 40 on the cartridge case body to lock the lid 38 in a fully closed position.

The gas cartridge 32 is a commercially available disposable gas cylinder or cartridge filled with liquefied butane gas containing butane as a chief ingredient. The disposable butane gas cartridge 32 is readily available, easy to handle, transport and store as compared to other fuels such as gasoline, and hence is particularly suitable for use with gas-engine-powered agricultural working machines used in fields and farms. The gas engine 12 uses a fuel gas formed as a result of vaporization of the liquefied butane. The liquefied butane is hereinafter referred to as "liquefied gas".

The regulator 33 doubles in function as a pressure regulator for regulating the pressure of fuel gas flowing out from the gas cartridge 32 under pressure, and also as a connector for connecting the gas cartridge 32 and the gas feed pipe 20.

The cartridge sensor 34 is a limit switch having an actuator 34a. When the gas cartridge 32 is correctly set in the cartridge case 31, the actuator 34a is depressed by the gas cartridge 32 whereupon the limit switch 34 generates a detection switch.

Since the gas cartridge 32 received in the thermally insulated cartridge case 31 does not give heat to, or take heat from, surroundings even when the cartridge case 31 is placed either in a high temperature condition or in a low temperature condition, temperature control of the gas cartridge 32 is performed stably without being influenced by the outside air temperature with the result that the liquefied gas can be maintained at a temperature suitable for vaporization. In other words, if there were an exchange of heat between the gas cartridge 32 and the outside air temperature, this phenomenon would cause a disturbance, making it impossible to perform stable temperature control of the gas cartridge 32. To avoid the occurrence of this problem, it is particularly advantageous to set the gas cartridge 32 in the thermally insulated cartridge case 31.

Since the gas cartridge 32 is heated by the electric heater 35 disposed inside the thermally insulated cartridge case 31, heat generated by the electric heater 25 is efficiently transmitted to the liquefied gas held in the gas cartridge 32, without leaking to the outside of the cartridge case 31.

Figure 3:
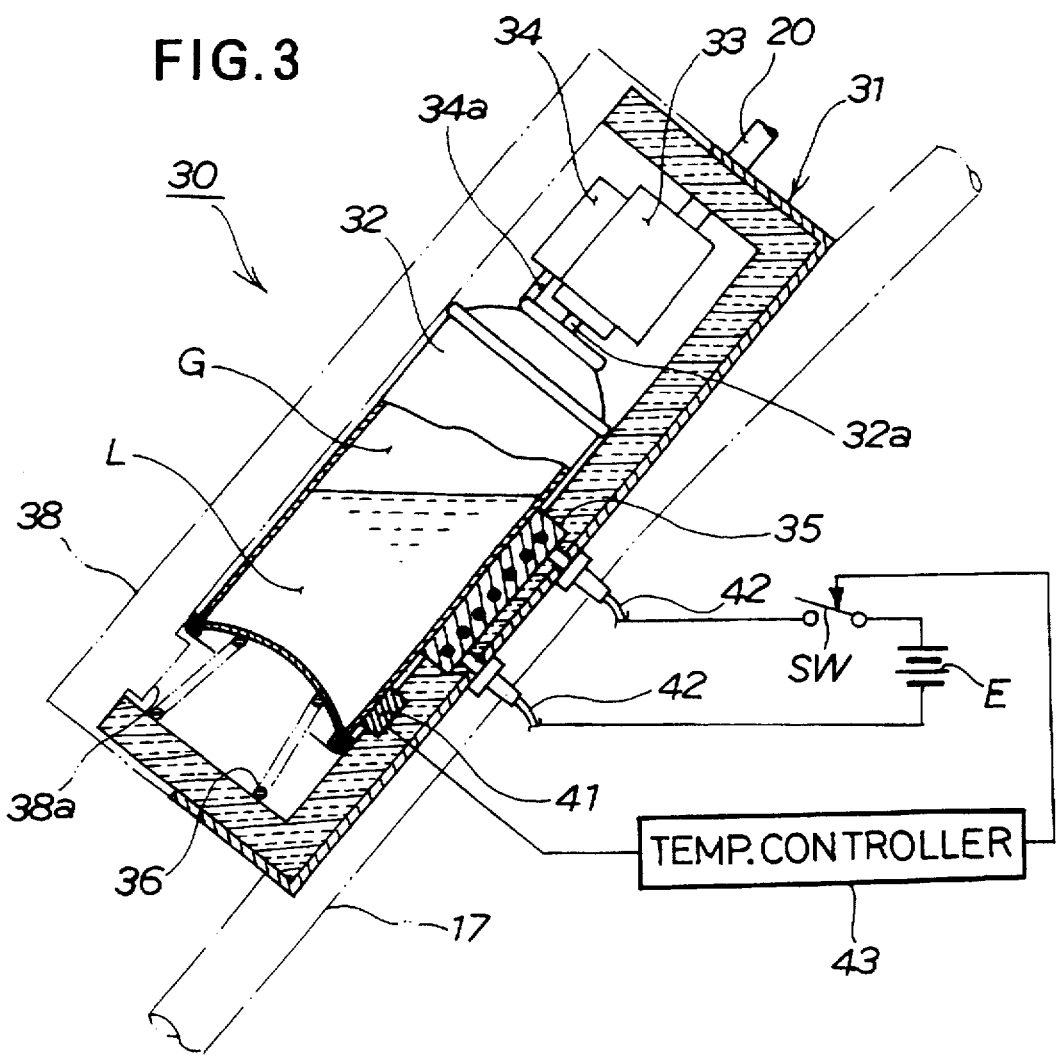
FIG. 3 is a cross-sectional view taken along line III—III of FIG. 2.

FIG. 3 shows a condition in which the fuel gas feed device 30 is attached to the hand post 17 of the steering handle unit 19 (FIG. 1).

In the illustrated condition, an internal space of the gas cartridge 32 is occupied by an upper layer of gas G and a lower layer of liquefied gas L. The electric heater 35 is designed to closely come in contact with the sidewall (cylindrical outside surface) of the gas cartridge 32 for heating the gas cartridge 32 to thereby increase the temperature of the liquefied gas L held inside the gas cartridge 32. The electric heater 35 preferably has a heating wire covered with an electrically insulating material.

A temperature sensor 41 is disposed inside the thermally insulated cartridge case 31 at a position adjacent to one end (lower end in FIG. 3) of the electric heater 35 so that it can detect the temperature of a bottom portion of the gas cartridge 32. Reference numerals 42, 42 denote cables connected to the electric heater 35 for supplying electric power from a power supply E to the electric heater 35.

Figure 4:
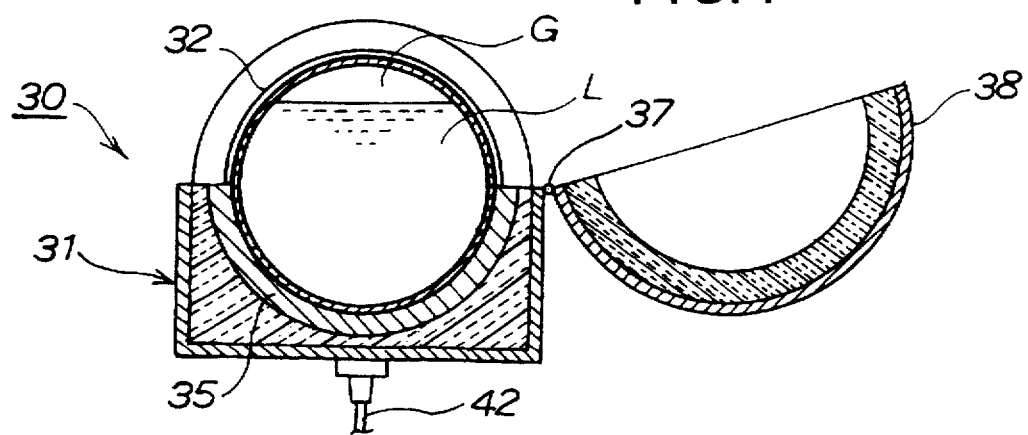
FIG. 4 is a cross-sectional view taken along line IV—IV of FIG. 2.

As shown in FIG. 4, the electric heater 35 has a hemi-circular transverse cross-sectional shape and is arranged so as to fit with and thus heat the sidewall of the gas cartridge 32 along a lower half thereof while the gas cartridge 32 is received in the cartridge case 31.

Partly because of the hemi-circular transverse cross-sectional shape of the electric heater 35, and partly because of the gas cartridge 32 received in the thermally insulated cartridge case 31, heat generated by the electric heater 35 is efficiently transmitted to the gas cartridge 32 and thence to the liquefied gas L held inside the gas cartridge 32, thereby promoting vaporization of the liquefied gas L.

The electric heater 35 used in the illustrated embodiment is advantageous because its calorific power can be controlled easily, accurately and rapidly. This means that the temperature of the gas cartridge 32 can be also raised easily, accurately and rapidly.

The temperature sensor 41 is arranged so as to be disposed in the proximity of a portion of the sidewall (cylindrical outside surface) of the gas cartridge 32 located near the bottom of the gas cartridge 32. With the temperature sensor 41 thus arranged, the temperature of the liquefied gas L in the gas cartridge 32 can be measured accurately.

Figure 5A:
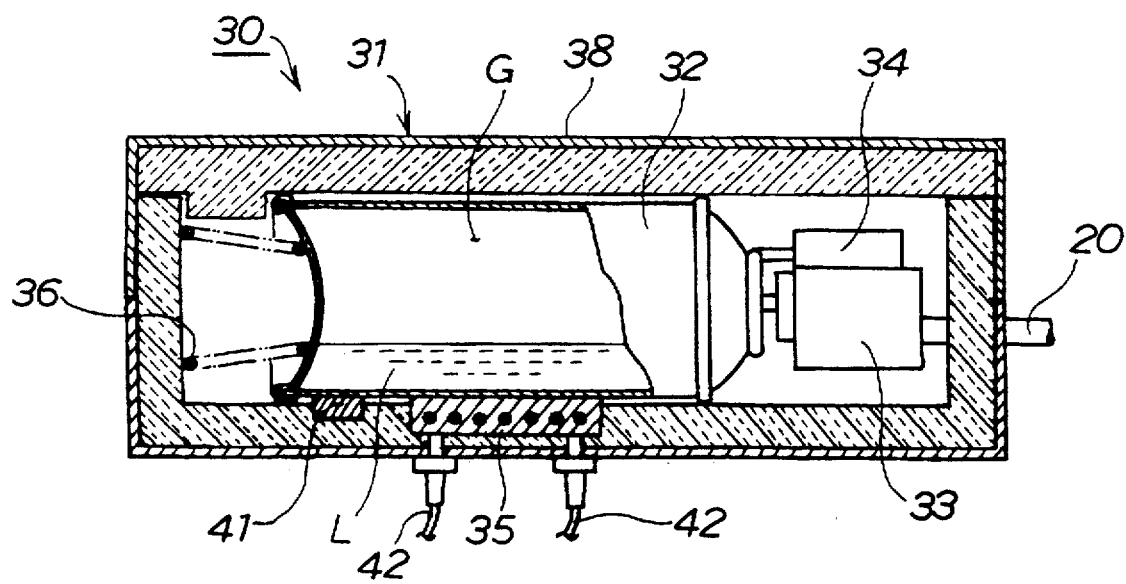
FIG. 5A is a longitudinal cross-sectional view showing another arrangement of the fuel gas feed device according to the present invention.
Figure 5B:
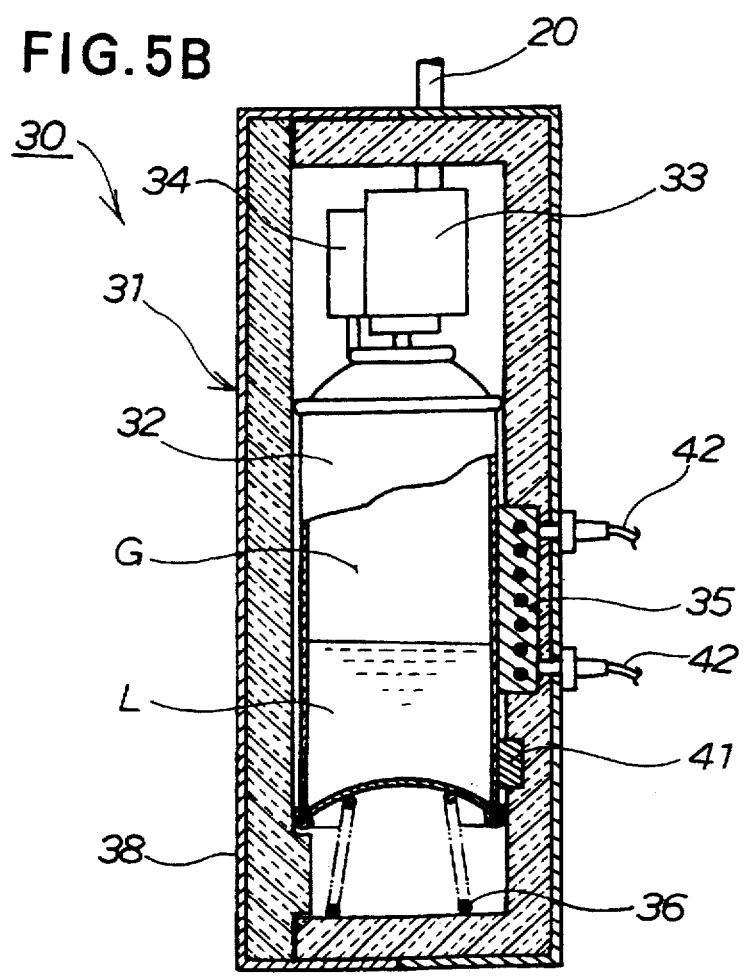
FIG. 5B is a view similar to FIG. 5A, but showing still another arrangement of the fuel gas feed device according to the present invention.

FIGS. 5A and 5B illustrate two different examples of placement or installation of the fuel gas feed device 30 according to the present invention. In the example shown in FIG. 5A, the fuel gas feed device 30 is disposed horizontally, while the fuel gas feed device 30 in the example shown in FIG. 5B is disposed vertically.

It appears clear from FIG. 5A that by virtue of the temperature sensor 41 arranged to detect the temperature of a lower half of the sidewall (the cylindrical outside surface) of the gas cartridge 32, it is possible to detect the temperature of that portion of the sidewall of the gas cartridge 32 which is held in direct contact with the liquefied gas L even when only a small quantity of liquefied gas L is left in the gas cartridge 32.

In the case of the vertically disposed fuel gas feed device 30 shown in FIG. 5B, it is also possible to detect the temperature of a portion of the sidewall of the gas cartridge 32 held in contact with the liquefied gas L because the temperature sensor 41 is disposed in the proximity of the a bottom portion of the sidewall of the gas cartridge 32.

As is understood from the description previously described in conjunction with the three different arrangements respectively shown in FIGS. 3, 5A and 5B, the temperature sensor 41 is disposed in the proximity of a sidewall portion of the gas cartridge 32 held in contact with the liquefied gas L until the gas cartridge 32 becomes almost empty with the result that the temperature of that portion of the gas cartridge 32 which is held in contact with the liquefied gas can always be detected with high accuracy regardless of the posture of the gas cartridge 32 received in the cartridge case 31 of the fuel feed device 30.

The fuel feed device 30 of the foregoing construction will operate as follows.

At the start of the gas engine 12 (FIG. 1), when the temperature of the gas cartridge 32 shown in FIG. 3 is low and the liquefied gas L held in the gas cartridge 32 is difficult to becomes vaporized due to low temperature, if the temperature detected by the temperature sensor 41 is below a predetermined temperature range (20° C.±5°, for example), the temperature sensor 41 sends a signal to a temperature control unit 43 which in turn generates a control signal to close a switch SW whereupon electric power is supplied from a power supply E to the electric heater 35, thereby starting heating of the gas cartridge 32 by the electric heater 35.

Thereafter, the temperature of the gas cartridge 32 detected by the temperature sensor 41 reaches the predetermined temperature range whereupon the temperature sensor 41 sends a signal to the temperature control unit 43 which in turn generates a control signal to open the switch SW, thereby stopping the supply of electric power from the power supply E to the electric heater 35 to terminate heating of the gas cartridge 35 by the electric heater 35.

After the gas engine 12 operates continuously for a long time with continuous vaporization of the liquefied gas L, the temperatures of the liquefied gas L and the gas cartridge 32 are decreased because heat is taken away from the liquefied gas L and the gas cartridge 32 due to heat of vaporization of the liquefied gas L. Under such low temperature condition, the liquefied gas L is difficult to become vaporized. In this instance, if the temperature detected by the temperature sensor 41 is below the predetermined temperature range, the gas cartridge 32 is heated by the electric heater 35. Heating of the gas cartridge 32 is terminated when the temperature detected by the temperature sensor 41 reaches the predetermined temperature range.

Since the thermally insulated cartridge case 31 for receiving therein the gas cartridge 32 is disposed longitudinally along the handle post 17, and since the handle post 17 is separated from the gas engine 12, it is possible to freely set the position of the cartridge case 31. With the cartridge case 31 thus arranged, a space in the gas-engine-powered working machine 10 can be utilized efficiently without hindering smooth manipulation of the handle 18 by the operator, and the overall weight of the gas-engine-powered working machine 10 can be properly distributed.

By virtue of the fuel feed device 30 of the present invention, a liquefied fuel gas in a gas cartridge 32 can be stably supplied to the gas engine 12.

Obviously, various minor changes and modifications of the present invention are possible in the light of the above teaching. It is therefore to be understood that within the scope of the appended claims the invention may be practiced otherwise than as specifically described.

What is claimed is:

1. A fuel feed device for feeding a fuel gas from a gas cartridge to a gas engine, comprising:
   a thermally insulated cartridge case capable of being opened and closed for removably receiving therein the gas cartridge;
   a temperature sensor disposed inside said thermally insulated cartridge case for detecting a temperature of the gas cartridge; and
   an electric heater built in said thermally insulated cartridge case for heating the gas cartridge on the basis of the temperature detected by said temperature sensor so that the temperature detected by said temperature sensor is kept within a predetermined temperature range.

2. A fuel feed device according to claim 1, further including a temperature control unit for controlling operation of said electric heater so as to keep the temperature detected by said temperature sensor within said predetermined temperature range.

3. A fuel feed device according to claim 1, wherein said electric heater has an arcuate transverse cross-sectional shape and is arranged to heat a sidewall of the gas cartridge along a lower portion thereof while the gas cartridge is received in said thermally insulated cartridge case.

4. A fuel feed device according to claim 1, wherein said temperature sensor is arranged so as to be disposed in the proximity of a sidewall of the gas cartridge while being received said cartridge case, so as to detect the temperature of the gas cartridge on the basis of a temperature of the sidewall of the gas cartridge.

5. A fuel feed device according to claim 1, wherein said thermally insulated cartridge case is disposed independently at a position remote from the engine.

6. A gas-engine-powered working machine including a gas engine using a fuel gas supplied from a gas cartridge, comprising:
   a working unit driven by the gas engine and having at least one wheel for enabling said working machine to be transported from one point to another;
   a steering handle unit operatively connected to said working unit to steer the same;
   a thermally insulated cartridge case disposed on said steering handle unit and capable of being opened and closed for removably receiving therein the gas cartridge;
   a temperature sensor disposed inside said thermally insulated cartridge case for detecting a temperature of the gas cartridge; and
   an electric heater built in said thermally insulated cartridge case for heating the gas cartridge on the basis of the temperature detected by said temperature sensor so that the temperature detected by said temperature sensor is always kept within a predetermined temperature range.

7. A gas-engine-powered working machine according to claim 6, further including a temperature control unit for controlling operation of said electric heater so as to keep the temperature detected by said temperature sensor within said predetermined temperature range.

8. A gas-engine-powered working machine according to claim 6, wherein said steering handle unit has a handle post connected at one end to said working unit, and said thermally insulated cartridge case is attached to said handle post in such a manner that the gas cartridge received in said cartridge case extends longitudinally of said handle post.

* * * * *